Feb. 18, 1930.       P. AVILLA       1,747,657
SELF CENTERING CHUCK
Filed April 20, 1927
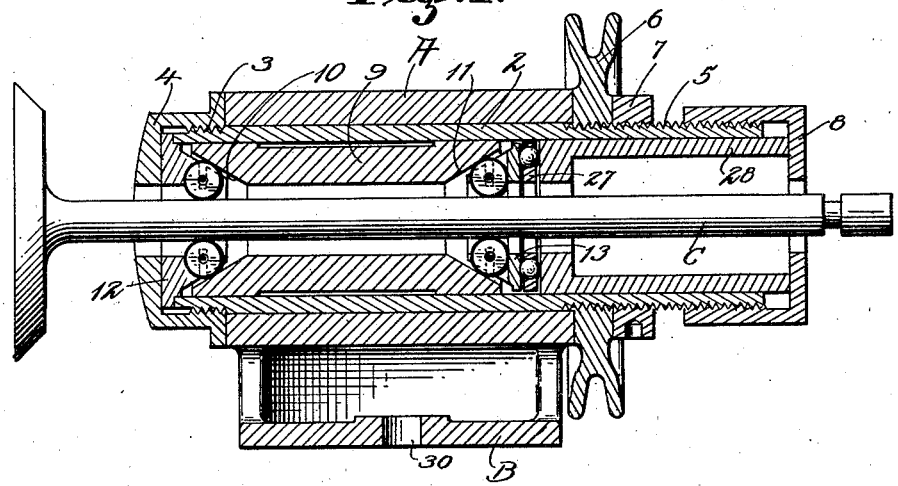
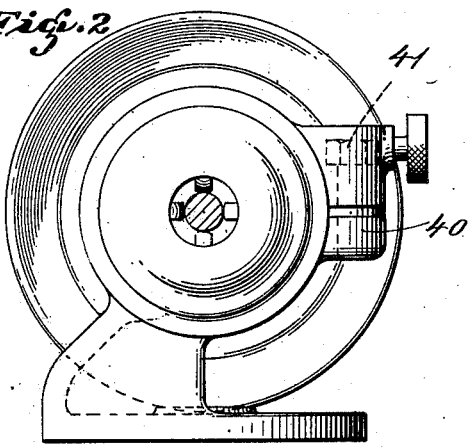
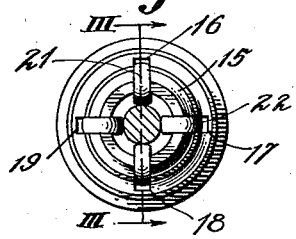
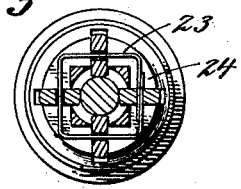
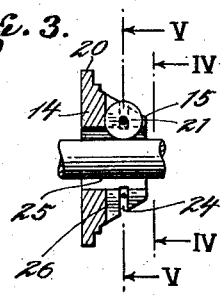
INVENTOR.
Philip Avilla
BY
Townsend, Loftus & Abbett
ATTORNEYS.

Patented Feb. 18, 1930

1,747,657

UNITED STATES PATENT OFFICE

PHILIP AVILLA, OF SAN FRANCISCO, CALIFORNIA

SELF-CENTERING CHUCK

Application filed April 20, 1927. Serial No. 185,210.

This invention relates to a chuck such as used in conjunction with grinding machines, etc., and especially to a self-centering type of chuck.

Chucks which are constructed to center, secure and rotate a part to be machined or ground are extensively used but the majority have one objection or another. For instance, the chuck may have too large an overhang; too much time may be lost in centering the part or in securing or removing the same; compensation for uneven wear of the gripping jaws is not always provided; the range of movement of the gripping jaws may not be sufficient, etc.

The object of the present invention is to generally improve and simplify the construction and operation of chucks of the character described; to provide a chuck which employs two sets of interspaced gripping jaws so as to provide a rigid support; to provide a chuck in which the overhang is reduced to a minimum; to provide a chuck in which the gripping jaws are self-centering and permitted a considerable range of movement; to provide a chuck in which wear of the gripping jaws is uniform and automatically taken up; to provide a chuck in which the work may be inserted automatically, centered and secured or conversely, removed in a minimum of time by the mere tightening or slackening of a single nut; and further to provide a chuck which may be housed and secured within a tubular driving spindle. The invention is shown by way of illustration in the accompanying drawings, in which:

Fig. 1 is a central vertical longitudinal section through the chuck,

Fig. 2 is an end view of the same,

Fig. 3 is a longitudinal section taken on line III—III, Fig. 4,

Fig. 4 is an end view of one of the gripping cones looking in the direction of arrows IV—IV, Fig. 3, Fig. 5 is a cross section of one of the gripping cones taken on line V—V, Fig. 3.

Referring to the drawings in detail and particularly Figs. 1 and 2, A indicates a bearing member which in this instance if formed integral with a circular shaped base plate B. Journaled in the bearing is a tubular spindle 2. The front end of the opposite end of the spindle is threaded as indicated at 5 to receive a driving pulley 6, a lock nut 7 and a cap nut 8. Mounted within the spindle is a sleeve 9, the opposite ends of which are cone-shaped as indicated at 10 and 11. Co-operating with the sleeve 9 is a pair of cone-shaped members generally indicated at 12 and 13. These members are identical in construction and the description of one should accordingly suffice. The cone-shaped members are best illustrated in Figs. 3, 4 and 5. It consists of a head section 14, a reduced cone-shaped portion 15 which is provided with four radially disposed slots such as indicated at 16, 17, 18 and 19 and an annular flange 20, the function of which will hereinafter be described. Mounted in each slot is a gripping jaw 21. These jaws are in the form of rollers, the exterior surfaces of which are rounded as indicated at 22. The rollers are centrally perforated and a spring wire 23 is passed through the several rollers to prevent accidental removal of the rollers and also to serve the function of normally pulling the rollers in a radial direction towards a center piont. An annular groove 24 is formed in the reduced cone-shaped portion 15 and this retains the wire 23 against endwise removal but at the same time permits radial movement for expansion and contraction. Each cone-shaped member 12 and 13 is provided with a central longitudinal extending opening 25 and the inner end of the slots 16, 17, 18 and 19 terminate in vertical faces 26 to form guides for the rollers or gripping jaws during their inward and outward radial movement as will hereinafter be described. The rest of the mechanism employed in conjunction with the chuck is also mounted interiorly of the driving sleeve 2 and it consists of an anti-friction annular ball race 27 and a take-up sleeve 28 which is engaged by the cap nut 8.

For the purpose of describing the use and operation of the chuck, it will be supposed that it will be used in conjunction with a grinding machine. In that instance, a support will be provided on the grinding machine adjacent the grinding wheel. The base plate B of the chuck will in that instance be secured to the support by means of a bolt passing through a central perforation 30 in the base. It may accordingly be swung about this bolt to assume any angular position desired with relation to the grinding wheel. It will also be assumed that an ordinary valve such as shown in Fig. 1 is to be ground. If this is the case, it is only necessary to insert the stem C of the valve as shown in Fig. 1. This is accomplished as follows: Cap nut 8 is slackened up on the thread, the end of the stem is then inserted through the perforated front cap 4 and through the cone 12, the sleeve 9, the cone 13, the take-up sleeve 28 and the cap nut 8. The moment the stem is inserted and the valve proper aligns with the grinding wheel, it is only necessary to tighten up on the cap nut 8. This forces the take-up sleeve 28 inwardly against the anti-friction thrust bearing 27. This in turn exerts an end pressure on the cone 13 and the sleeve 9. The gripping jaws or rollers in the cone are thus forced inwardly against the stem to grip the same due to their engagement with the cone-shaped end 11 of the sleeve. Inward pressure is at the same time exerted on the sleeve 9 and the cone-shaped face 10 on the opposite end will engage the gripping jaws or rollers in the cone 12 and force these inwardly into gripping engagement with the stem, any degree of gripping being obtained by the nut 8. The tightening movement of the nut 8 serves the function of forcing the gripping jaws radially in an inward direction to grip and secure the stem of the valve and the cone-shaped ends of the sleeve 9 and at the same time serves the function of automatically centering the gripping jaws and the stem. In other words, the mere tightening of a single nut accomplishes two functions, to wit, that of centering the stem and that of gripping the same. The vertical faces formed on the cones 12 and 13 and indicated at 26 are in this instance of considerable importance as the pressure exerted by the cone-shaped members 10 and 11 on the roller-like gripping jaws would tend to force them not only radially in an inward direction, but it would also tend to separate them longitudinally or in other words, to move them longitudinally with relation to the stem and the cones 12 and 13 retaining the same. This would be more or less fatal as the wire retaining the rollers or gripping jaws would tend to shear. Such a shearing action is, however, entirely prevented as the gripping jaws or rollers would at all times abut the vertical faces 26, thereby relieving the spring wire 23 of any shearing strain.

If it is desired to release the valve after the grinding operation is completed, it is accomplished by merely slackening up on the nut 8. This instantly releases the inward pressure on the gripping jaws and the valve stem is thus free for endwise removal. If a valve having a larger stem is to be inserted, it is merely necessary to slacken the nut 8 a little more as the insertion of a large stem through the front nut 4 will cause the gripping jaws to spread apart in a radial direction and such spreading movement will be transmitted to move the sleeve 9 inwardly and similarly, the cone 13 and the take-up sleeve 18. Quick adjustment for stems of varying diameters is thus obtained by the single nut 8, i.e., it does not only serve the function of releasing or securing the device to be worked upon, but it also permits adjustment of the gripping jaws to take stems or parts of varying diameters. The range of movement of the gripping jaws in a radial direction is considerable and stems or other parts to be chucked having a considerable variation in diameter may accordingly be handled.

The overhang in a chuck of this character is practically nothing or at least it is reduced to a minimum due to the fact that the entire chucking mechanism is mounted within the driving spindle. Any play of the valve from a true central position is accordingly eliminated. Two sets of gripping jaws widely separated are employed which is only important as it provides a rigid two-point support for the stem. Any wear on the gripping jaws will be practically uniform as the gripping jaws are rotated whenever a new stem is inserted or removed, and the wear is automatically taken up by the cone-shaped ends 10 and 11. The annular flange 20 shown in Fig. 3 is only necessary on the outer cone 12 as it is desirable to rigidly secure that cone between the end cap 4 and the spindle, longitudinal movement of this cone being unnecessary in view of the fact that the cone 13 is free to move longitudinally and so are the sleeves 9 and 28. Any driving connection may be formed between the pulley 6 and the spindle 2 but a threaded connection such as illustrated is desirable so that any end wear in the bearing may be taken up, i. e., if wear takes place between the cap 4 and the end of the bearing or between the inner face of the pulley and the opposite end of the bearing, it can be taken up by merely turning the pulley on the thread in one direction until the play is taken up and then securing the pulley by tightening up the lock nut 7. Any wear between the driving spindle and the bearing proper may be taken up in the usual manner by splitting one side of the bearing as indicated at 40 and employing a take-up nut such as shown by dotted lines at 41.

While certain features of the present invention are more or less specifically described and indicated, I wish it understood that various changes may be resorted to within the scope of the appended claims; similarly, that the materials and finish of the several parts employed may be such as the manufacturer may dictate or varying conditions or uses may demand.

Having thus described my invention, what I claim and desire to secure by Letters Patent is:—

1. A device of the character described, comprising a tubular spindle, a cone-shaped member secured in one end of the spindle, a second cone-shaped member mounted within the spindle, said cone-shaped members being so positioned as to have their apexes point toward each other, a sleeve disposed between the cone-shaped members, said sleeve having annular cone-shaped ends formed thereon, the apexes of which point towards each other, a plurality of gripping jaws carried by the first and second named cone-shaped members and movable radially with relation to a longitudinal axis drawn through said cone-shaped members, a take-up sleeve also mounted within the tubular spindle, an anti-friction bearing interposed between the second named cone and the take-up sleeve and a nut carried by the spindle and engageable with the take-up sleeve to impart longitudinal movement to the take-up sleeve, the anti-friction bearing, the second named cone and the sleeve having the cone-shaped ends formed thereon.

2. A device of the character described, comprising a tubular spindle, a cone-shaped member secured in one end of the spindle, a second cone-shaped member mounted within the spindle, said cone-shaped members being so positioned as to have their apexes point toward each other, a sleeve disposed between the cone-shaped members, said sleeve having annular cone-shaped ends formed thereon, the apexes of which point towards each other, a plurality of gripping jaws carried by the first and second named cone-shaped members and movable radially with relation to a longitudinal axis drawn through said cone-shaped members and means for imparting longitudinal movement to the second named cone and to the sleeve, a bearing supporting the tubular spindle, means for driving the spindle and adjustable means for securing the spindle against endwise movement in the bearing.

3. In a device of the character described, a gripping member, said gripping member being cone-shaped and having a central longitudinally extending opening formed therein, said cone-shaped member being also provided with a plurality of interspaced radially disposed slots in communication with the central opening, a plurality of disc-shaped rollers carried by the cone, said rollers being disposed in the slotted portions thereof and being supported and guided thereby, said cone having an annular groove formed in its exterior surface at a point adjacent the apex thereof and a spring wire adapted to be disposed in said groove, said spring wire extending through the rollers and yieldingly resisting radial outward movement of the rollers in the slots.

4. In a device of the character described, a housing, a sleeve journaled therein, means for rotating the sleeve, a stationary cone-shaped member mounted within the sleeve, a second cone-shaped member within the sleeve and adapted to telescope with relation to the stationary cone and longitudinally movable within the sleeve, a plurality of gripping members carried by the stationary cone and engageable with the second cone, and means carried by the sleeve for imparting movement to the second-named cone.

PHILIP AVILLA.